Aug. 1, 1933.  C. W. HANSELL  1,920,304
INDICATOR
Filed Jan. 16, 1930

INVENTOR
CLARENCE W. HANSELL
BY
ATTORNEY

Patented Aug. 1, 1933

1,920,304

UNITED STATES PATENT OFFICE 1,920,304

INDICATOR

Clarence W. Hansell, Port Jefferson, N. Y., assignor to Radio Corporation of America, a Corporation of Delaware Application January 16, 1930. Serial No. 421,118

16 Claims. (Cl. 175—368.)

The main object of my present invention is to provide a new and useful method and means for determining accurately over a wide range of frequencies a characteristic of an undulatory source.

Another object of my invention is to provide a meter for indicating the frequency or wave length of an undulatory source, which will be accurate over a wide range of frequencies or wave lengths and be less expensive to construct than meters now in use.

A further object of my invention is to provide a meter utilizing for wave measurement purposes, standing wave phenomena. I carry out this object by utilizing the source whose characteristic is to be determined to produce in a linear mechanical oscillator or element, a travelling vibration or wave, reflecting the travelling wave and measuring a characteristic of the resultant standing wave which in turn corresponds exactly to the same characteristic of the source producing the travelling waves.

A further object of my invention is to utilize for wave indication purposes various types of standing waves, such as flexural waves and torsional waves.

When forming standing waves by producing a travelling wave and then reflecting it, the reflected wave may in turn become rereflected. As the rereflected wave tends to upset the stable position of the standing wave, and to change the input energy to the device in a way to vary its sensitivity a further object of my invention is to eliminate the rereflected wave. This I do by damping the rereflected wave either mechanically or electromagnetically. For mechanical damping a solid such as rubber may be used or, preferably fluids such as liquids and gases are resorted to.

In the appended claims I have defined with particularity the novel features of my invention. However, it may best be understood as to its method of operation and structural organization by referring to the accompanying drawing in which Figure 1 discloses a meter for indicating, by means of a flexural standing wave, a characteristic of an undulatory source, Figure 2 indicates a form of mechanical damping means, Figures 3 and 4 disclose diagrammatically apparatus for producing torsional standing waves to indicate the characteristic of an undulatory wave source, and Figure 5 indicates schematically means for damping rereflected torsional waves.

Figure 1:
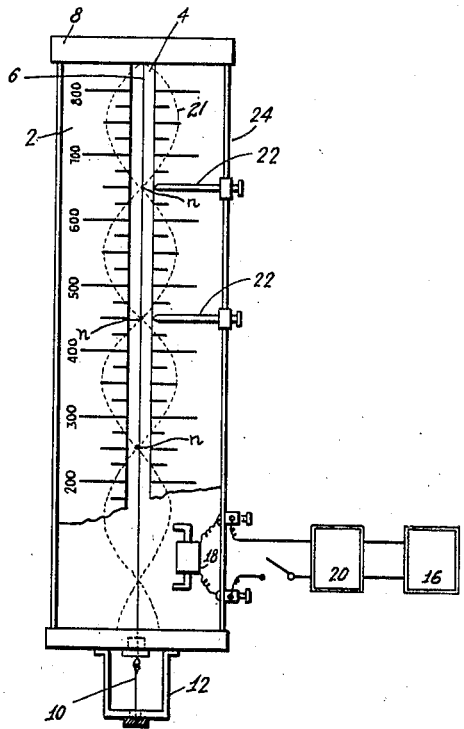

Referring to Figure 1, behind member or within a casing 2 having a longitudinal slit 4 therein, there is mounted visibly within the slit a linear vibrator or oscillator 6 of wire, rod, or strip like form. At one end the oscillator is fastened in any suitable fashion to end piece 8 of the casing and at its other end the vibrator is looped through a threaded bolt 10 which in turn is held in fixed stretched position against frame work 12 by means of a nut. If the oscillator is in rod form, it may be left mechanically free at end 8.

A source of undulatory energy 16 is connected to an electromagnet 18, shown diagrammatically, mounted within the casing 2 adjacent the oscillator 6. In the event that the undulatory source is weak, an amplifier 20 of any suitable type to strengthen it to a value necessary to operate the electromagnet 18, is provided. In the event that the undulatory source 16 is a mechanical source, it may be transformed in any well-known fashion to electrical undulations and then fed to electromagnet 18 for the purpose of having the characteristics of the source determined.

Fluctuating current in the electromagnet 18 causes mechanical waves to travel down the oscillator to end 8 where they are reflected towards the electromagnet 18. Both waves cause mechanical element 6 to vibrate. The resultant vibration or wave in the linear mechanical oscillator 6 will be standing wave 21 as shown in dotted lines having nodes in which are visible through the slit as they are relatively stationary.

By means of pointers 22 movable along track 24 and by virtue of the scale or scales on casing 2, the distance between nodes can be readily determined. Error in measurement may be reduced by measuring the distance between a number of nodes and dividing by a suitable divisor. From the measurement, the frequency or wave length of the undulatory source 16 may, therefore, be easily calculated. Preferably, however, the scale on the casing should be made such to indicate directly frequency or wave length or both.

The core of the electromagnet is preferably permanently magnetized so that only variation in pull on the wire without reversal of magnetism ensues in order to give direct frequency indication. With an unmagnetized core, a double frequency recording occurs from which, of course, the frequency of the source may readily be calculated or indicated directly by appropriate scales.

An alternative embodiment is one where the undulatory source is a mechanical one. Direct mechanical connection may be made by means of a rod connected to the oscillator and vibrated by the source. It is preferable, however, to use electromagnetic vibrating means for the rod.

In order to reduce or prevent rereflection of the reflected wave from the electromagnet end of the oscillator, which would change the input impedance of the coupling magnet and so cause undesired variations in the amplitude of vibration of the oscillator, the portion of the oscillator below the electromagnet may be embedded in soft rubber. This, of course, will give one type of mechanical damping.

Figure 2:
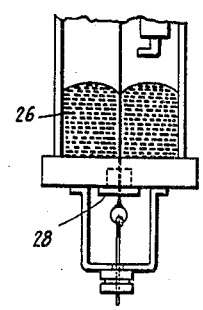

Another effective way of producing damping is shown in figure 2 wherein the portion of the oscillator below the vibrating means such as the electromagnet is surrounded by a fluid 26 in liquid form such as oil. In order to prevent leakage thereof a stuffing gland 28 of known form is provided.

Figure 3:
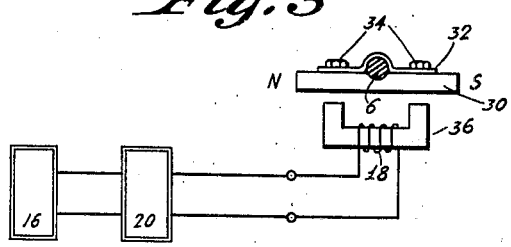
Figure 4:
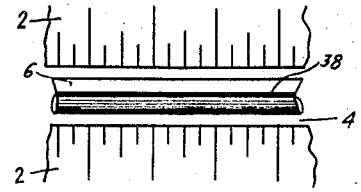

A manner in which torsional vibrations or torsional standing waves are produced for indicating the characteristic of an undulatory source is indicated in Figures 3 and 4. A permanent magnet 30 is fastened by means of a plate 32 and bolts 34 to the oscillator 6 which, in this figure, is shown in cross section. As the electromagnet 18 changes the polarity of pole 36, due to the alternate attraction and repulsion of one end of the permanent magnet, traveling torsional waves are sent down the oscillator 6. Upon reaching the distant end of the rod the traveling torsional vibrations are reflected, the traveling and torsional waves combining to produce a resultant standing torsional mechanical oscillation in the mechanical oscillator 6.

In order to indicate the torsional standing wave the oscillator is centrally disposed within the slit 4 of element 2 as shown diagrammatically in Figure 4. A thin marking line 38, such as that produced, for example, by painting a thin strip of red paint along the length of oscillator 6, will indicate nodes of torsional waves when the rod is twisted by the undulatory source acting through electromagnet 18; for, as the rod is twisted the vibrating parts will not be seen but the nodes will appear as in Figure 1 as spots, the distance between which readily indicates the characteristic of the undulatory source 16. Rather than use a marked oscillator, a very thin ribbon may be utilized, which when twisted will show nodes and maximum points of vibration.

Figure 5:
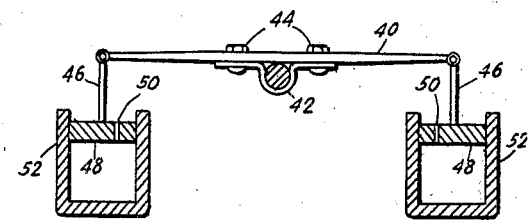

As stated with reference to Figure 1 mechanical means may be utilized to twist a rod; and, a rubber element may be used to mechanically damp the reflected torsional vibrations. However, it is preferred to damp this type of reflected oscillation with some form of gaseous or liquid friction and one arrangement for doing so is shown in Figure 5.

At the vibrating end of the rod 6 a link 40 is attached thereto by a suitable plate 42 and bolts 44. Link 40 is coupled to piston rods 46 which in turn work pistons 48, having small apertures 50 therein, in cylinders 52, causing desired damping action in a manner similar to that caused by the well known dashpot arrangement.

For electromagnetic damping action an electromagnet may replace the damping devices shown. By inducing heavy currents therein by the reflected rod vibrations, damping will ensue. It is also possible to so proportion the coupling magnet 18 and its associated circuits as to produce the desired degree of damping.

Still another method for damping the vibrating element is to so design the strip that there is a continuous loss of energy and attenuation of the waves as they travel along the strip. This may be done by operating the strip in a gas, such as air or, where more friction is needed it may be immersed in a viscous liquid such as oil.

I claim as my invention:—

1. In combination, a member having a narrow slit therein, a linear mechanical oscillator positioned within the slit, and means to set up vibrations in the oscillator whereby only nodal points on the oscillator are visible through the slit.

2. In combination, a member having a narrow slit therein, a linear mechanical oscillator positioned within the slit, means to set up traveling and reflected waves in oscillator whereby only nodal points of the resultant standing wave are visible through the slit, and means to measure the distance between nodal points.

3. In combination, a member having a narrow slit therein, a linear mechanical oscillator positioned within the slit, means to set up traveling and reflected waves in the oscillator, means to damp the reflected wave whereby only the nodal points of the resultant standing wave are visible through the slit, and means to measure a dimension of the standing wave so set up.

4. In combination, a member having a narrow slit therein, a linear mechanical oscillator positioned within the slit, means to set up traveling and reflected waves in the oscillator, fluid means to damp the reflected wave whereby only nodal points of the resultant standing wave are visible through the slit, and means to measure a dimension of the standing wave so set up..

5. The method of determining the frequency of an undulatory source which includes utilizing the source to set up torsional standing mechanical waves and utilizing the wave to ascertain the frequency.

6. The method of measuring the wave length or frequency of an undulatory source which includes utilizing the source to set up torsional standing mechanical waves, and measuring the distance between points on the wave to determine the wave length or frequency of the source.

7. The method of measuring the wave length or frequency of an undulatory source which includes electrically utilizing the source to set up torsional, standing, mechanical waves, and measuring the distance between points on the wave to determine the wave length or frequency of the source.

8. The method of determining a characteristic of an undulatory source which includes utilizing the source to produce traveling and reflected torsional waves, damping the reflected wave, and measuring the distance between points on the resultant wave to determine the sought characteristic.

9. The method of measuring the wave length or frequency of an undulatory source which includes utilizing the source to electromagnetically produce torsional traveling and reflected mechanical waves, damping the reflected wave and measuring the distance between points on the resultant standing torsional wave to determine the frequency or wave length of the undulatory source.

10. The method of measuring the frequency or wave length of a source of undulatory energy which includes electromagnetically producing a traveling torsional mechanical vibration with the undulatory energy, reflecting the torsional vibration, damping the reflected vibration and measuring the distance between nodal points on the resultant torsional vibration.

11. In combination, a linear mechanical element having a longitudinal mark thereon, means for setting up standing mechanical waves therein whereby in one direction only spaced points on the mark are visible, and means to measure the distance between the visible points.

12. In a system for determining the frequency of an undulatory source, the combination of a linear mechanical element having an axial marking thereon, means to set up a standing torsional wave in the element corresponding to the undulations of the undulatory source whereby only spaced points on the mark are visible and means to measure the distances between the visible points.

13. In combination, a linear mechanical element means to set up traveling and reflected torsional waves therein, means to damp the reflected torsional wave, and means to measure the distance between similar points on the resultant torsional standing wave.

14. In combination, a member having a narrow slit therein, a linear mechanical oscillator having an axial mark thereon positioned within the slit, and means to set up torsional vibrations in the oscillator whereby only points on the mark corresponding to nodes of vibration are visible through the slit.

15. In combination, a member having a narrow slit therein, a linear mechanical oscillator having an axial mark thereon positioned within the slit, means to set up traveling and reflected torsional waves in the oscillator, fluid means to damp the reflected torsional wave, said mark and slit being arranged so that only nodal points of the resultant standing torsional wave are visible through the slit and means to measure the distances between the visible points.

16. The method of determining the frequency of an undulatory source which includes utilizing the source to set up torsional standing mechanical waves comprising a travelling and a reflected wave, damping said wave and utilizing the wave to ascertain the frequency.

CLARENCE W. HANSELL.